(12) United States Patent
Sato et al.

(10) Patent No.: US 7,077,281 B2
(45) Date of Patent: Jul. 18, 2006

(54) COVER MOUNTING STRUCTURE OF WATERPROOF BOX

(75) Inventors: Hidetoshi Sato, Shizuoka (JP); Koji Miyakoshi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 15 days.

(21) Appl. No.: 10/321,630

(22) Filed: Dec. 18, 2002

(65) Prior Publication Data

US 2003/0136780 A1    Jul. 24, 2003

(30) Foreign Application Priority Data

Jan. 23, 2002    (JP) .............................. 2002-013839

(51) Int. Cl.
*B65D 6/10* (2006.01)
*B65D 43/04* (2006.01)
*H02G 3/14* (2006.01)

(52) U.S. Cl. .................... 220/3.8; 220/4.02; 220/62.18; 220/324; 220/796; 220/798; 220/806

(58) Field of Classification Search ................ 220/3.8, 220/4.02, 324, 797, 798, 806, 378, 62.18, 220/796, 783, 4.21
See application file for complete search history.

(56) References Cited

U.S. PATENT DOCUMENTS

| | | | | |
|---|---|---|---|---|
| 3,599,826 A | * | 8/1971 | Rocher | 220/324 |
| 4,027,778 A | * | 6/1977 | Tupper | 220/798 |
| 4,466,552 A | * | 8/1984 | Butterworth et al. | 220/798 |
| 4,620,061 A | * | 10/1986 | Appleton | 174/51 |
| 5,373,959 A | * | 12/1994 | Haasewinkel | 220/324 |
| 5,425,469 A | * | 6/1995 | Freedland | 220/495.11 |
| 5,435,641 A | * | 7/1995 | Dumon Dupuis et al. | 312/223.1 |
| 6,401,957 B1 | * | 6/2002 | Przytulla | 220/319 |
| 6,545,217 B1 | * | 4/2003 | Sato | 174/50 |
| 6,629,619 B1 | * | 10/2003 | Sato et al. | 220/4.02 |

* cited by examiner

*Primary Examiner*—Nathan J. Newhouse
*Assistant Examiner*—Niki M. Eloshway
(74) *Attorney, Agent, or Firm*—Armstrong, Kratz, Quintos, Hanson & Brooks, LLP

(57) ABSTRACT

A cover mounting structure of a waterproof box 1 which is composed of a container body 2 and a cover 3 to be mounted on an opening of the container body 2. The container body 2 includes side walls in a double-wall structure composed of an inner wall 21 and an outer wall 20, the inner wall 21 being projected longer than the outer wall 20. The cover 3 includes attached walls each of which is provided with an outer groove 27 defined between an outer wall portion 29 and a middle wall portion 30, and an inner groove 28 defined between the middle wall portion 30 and an inner wall portion 31, so that the cover 3 can be mounted to the container body 2 by respectively inserting the inner wall 21 and the outer wall 20 of the container body into the inner groove 28 and the outer groove 27 of the cover. On the middle wall portion 30 which is opposed to the relevant middle wall portion 30 in contact with an outer face of the inner wall 21 which is projected longer than the outer wall 20, there is provided a guide part 33 for guiding the opposed middle wall portion 30 into a gap between the outer wall 20 and the inner wall 21.

5 Claims, 9 Drawing Sheets

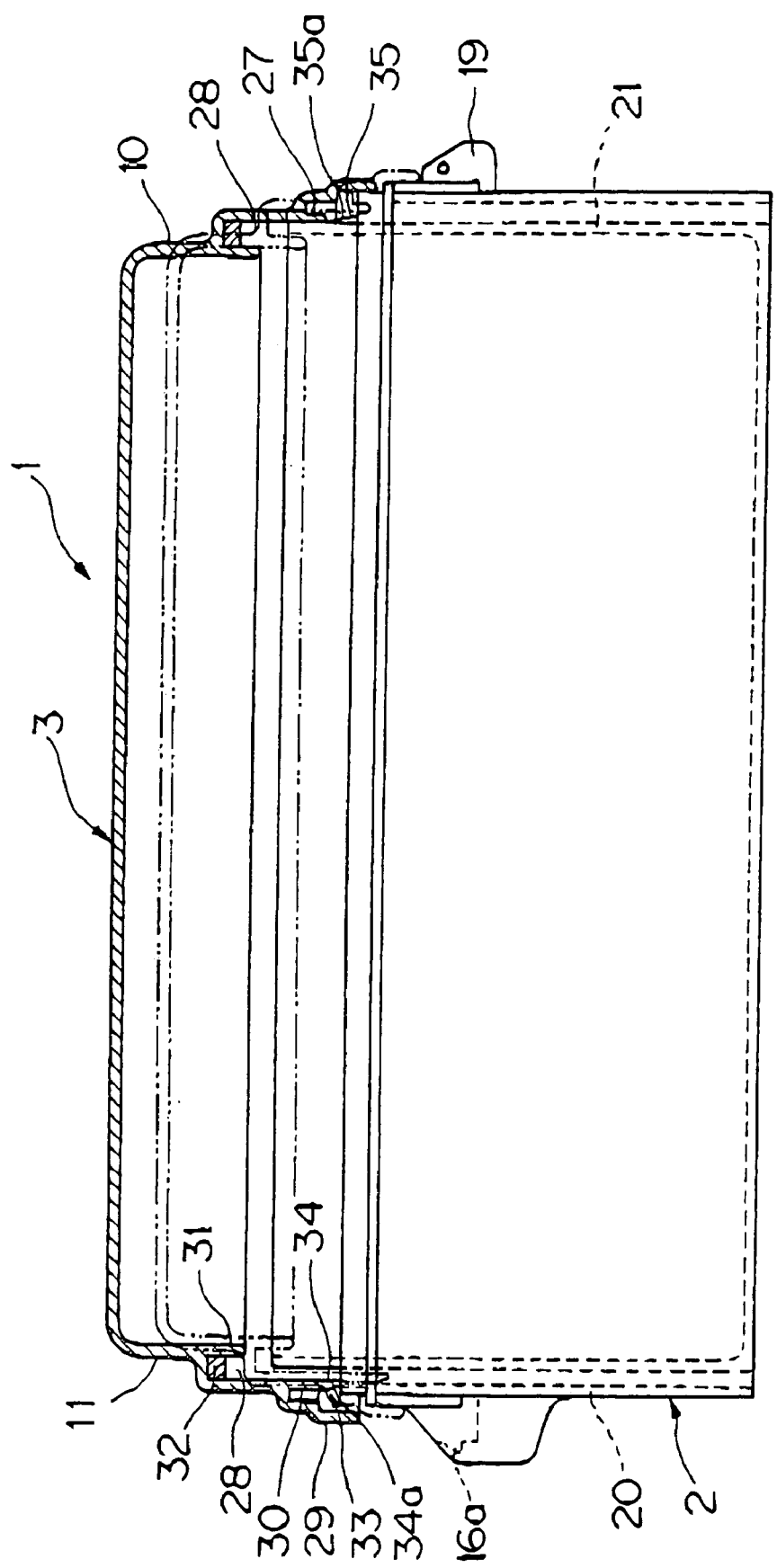
(FIG. 2)

COVER MOUNTING STRUCTURE OF WATERPROOF BOX

BACKGROUND OF THE INVENTION

1. Field of the Invention

The present invention relates to a waterproof box such as an electrical junction box which is used for wiring arrangement in a motor vehicle or the like, and more particularly to a structure for mounting a cover to a container body of the waterproof box which can ensure reliable waterproofing performance.

2. Description of the Related Art

There have been heretofore employed, in motor vehicles, waterproof boxes, for example, electrical junction boxes such as a junction box, fuse box, relay box, etc. in order to contain various parts required for connecting and treating wire harnesses in the vehicle, and electrical components such as fuses, relays, electronic control unit, etc.

Various types of the electrical junction boxes have been employed according to types of the vehicles. For example, various types of electrical components are contained in a box-like container made of synthetic resin or the like, which is composed of a container body and a cover.

Because the electrical junction box is generally arranged at side areas in a lower part of a vehicle body, there has been such an anxiety that the components such as circuits may cause a short circuit or a leaked current may flow, when water has intruded into an interior while driving in rain or during car wash. Therefore, it is necessary to render the electrical junction box waterproof. In case of washing a large car especially, high pressure water jetted with force is liable to intrude into the electrical junction box.

Specifically, the water which has collided against a side wall of the container body will sometimes flow along the side wall, enter between the side wall and the cover, and intrude into the container body. For this reason, it has been proposed that the side wall of the container body is formed to have a double-wall structure consisting of an outer wall and an inner wall. According to this structure, even though the water which has collided against the side wall has flowed along the side wall, and entered between the side wall and the cover, the water will intrude between the double walls, that is, between the outer wall and the inner wall. This water intruded between the double walls will lose force, and intrusion of the water into the container body can be restrained.

As another countermeasure, it has been proposed that a packing is provided between the cover and the container body, and waterproofing performance is ensured by compressing this packing to seal the cover with respect to the container body. However, in case where the cover is locked to the container body by resin-to-resin lock, compression rate of the packing may be low. For this reason, it has been further proposed that the lock between the cover and the container body is reinforced by employing a locking piece made of metal, in other words, the compression rate of the packing may be increased by engaging one end of this locking piece with the container body while the other end is engaged with the cover, thus enabling the cover to be rigidly pressed to the container body.

However, in the former case, on occasion of forming the side wall of the container body in the double-wall structure consisting of the outer wall and the inner wall, a gap between the outer wall and the inner wall has been made as small as possible in order to secure as large as capacity inside the container body. On that account, the gap between the outer wall and the inner wall may become smaller due to tolerances between the walls or inclination, which leads to bad assembling performance. As shown in FIG. 10, when a cover 71 is mounted to a container body 70, it sometimes happens that a lower end of an inner wall portion 72 of the cover 71 is not accurately positioned between an outer wall 73 and an inner wall 74 of the container body 70, but, for example, abutted against the outer wall 73. As the results, the container body 70 and the cover 71 are not favorably engaged with each other, resulting in a so-called half-engaged state. If the cover 71 should be pressed onto the container body 70 in this state, waterproofing performance may be deteriorated.

In the latter case, as shown in FIGS. 11 and 12, when a cover 81 is mounted to a container body 80, it sometimes happens that alignment between the container body 80 and the cover 81 cannot be accurately made due to variation in respective tolerances or inclination, in short, the cover 81 is not favorably mounted to the container body 80. Even though the container body 80 and the cover 81 should be tightened in this state by means of a locking hook 82, they cannot be rigidly pressed to each other, and the compression rate of the packing will not be increased. In such case, the waterproofing performance may be deteriorated.

The present invention has been made in view of the above described circumstances, and an object of the invention is to provide a cover mounting structure of a waterproof box by which reliable waterproofing performance can be ensured.

SUMMARY OF THE INVENTION

In order to attain the above described object, there is provided according to the present invention, a cover mounting structure of a waterproof box comprising a container body and a cover to be mounted on an opening of the container body, the container body including side walls in a double-wall structure each of which is composed of an inner wall and an outer wall, the inner wall being projected longer than the outer wall, the cover including attached walls, each of which is provided with an outer groove defined between an outer wall portion and a middle wall portion and an inner groove defined between the middle wall portion and an inner wall portion, wherein the cover is mounted to the container body by respectively inserting the inner wall and the outer wall of the container body into the inner groove and the outer groove of the cover, wherein, on the middle wall portion of the cover which is opposed to the relevant middle wall portion in contact with an outer face of the inner wall of the container body which is projected longer than the outer wall, there is provided a guide piece for guiding the opposed middle wall portion into a gap between the outer wall and the inner wall.

With such a structure, when the cover is mounted on the container body, the middle wall portion defining the outer groove of the cover is brought into contact with the outer face of the inner wall of the container body, and in this state, the cover is moved downwardly in a vertical direction. Then, by means of the guide piece which is provided on the middle wall portion opposed to the relevant wall portion, the opposed middle wall portion is guided into the gap between the outer wall and the inner wall. In short, the outer wall is inserted into the outer groove, and the cover is favorably mounted to the container body. As the results, it will be possible to reliably seal the cover with respect to the container body, and reliable waterproofing performance can be obtained.

Further, according to a second aspect of the present invention, there is provided a cover mounting structure of a waterproof box comprising a container body and a cover to be mounted on an opening of the container body, the container body including side walls in a double-wall structure each of which is composed of an inner wall and an outer wall, the inner wall being projected longer than the outer wall, the cover including attached walls, each of which is provided with an outer groove defined between an outer wall portion and a middle wall portion and an inner groove defined between the middle wall portion and an inner wall portion, wherein the cover is mounted to the container body by respectively inserting the inner wall and the outer wall of the container body into the inner groove and the outer groove of the cover, wherein, on an outer face of the inner wall, there is uprightly provided a guide for positioning the middle wall portion defining the outer groove, whereby the middle wall portion opposed to the relevant middle wall portion can be inserted into a gap between the outer wall and the inner wall.

With such structure, when the cover is mounted on the container body, the middle wall portion of the cover defining the outer groove is brought into contact with the inner wall provided with the guide on its outer face, and in this state, the cover is moved downward in a vertical direction. Then, the middle wall portion is moved along the guide toward the outer wall, and the middle wall portion opposed to the relevant middle wall portion will be introduced into the gap between the outer wall and the inner wall. As the results, as the outer wall is inserted into the outer groove, the cover can be favorably mounted to the container body. Accordingly, it will be possible to reliably seal the cover with respect to the container body, and reliable waterproofing performance can be obtained.

Preferably, an area of the guide to be faced with the opening of the container body is gradually inclined from the outer face of the inner wall toward the outer wall.

This will make the cover liable to move along the guide, and the cover can be smoothly mounted to the container body.

It is also preferable that on the middle wall portion opposed to the relevant middle wall portion which is in contact with an outer face of the inner wall of the container body which is projected longer than the outer wall and provided with the guide, there is provided a guide piece for guiding the opposed middle wall portion into the gap between the outer wall and the inner wall.

By providing the guide piece in this manner, the middle wall portion opposed to the relevant middle wall portion in contact with the inner wall is guided into the gap between the outer wall and the inner wall by means of the guide piece. Accordingly, the cover can be more favorably mounted to the container body, and the waterproofing performance can be more reliably obtained.

Preferably, the guide piece is provided, at a distal end portion of its outer face, with an inclined area which is gradually inclined inwardly toward the distal end portion.

This will make the guide piece liable to be guided into the gap between the outer wall and the inner wall, and the middle wall portion can be more reliably introduced into the gap between the outer wall and the inner wall.

According to a third aspect of the present invention, there is provided a cover mounting structure of a waterproof box comprising a container body and a cover to be mounted on an opening of the container body, the container body and the cover including respective fastening member engaging parts which hold fastening members to be engaged with each other so as to lock and seal the cover with respect to the container body, wherein, on either or both of the fastening member engaging parts, there is provided a guide part to be engaged with the other fastening member engaging part for guiding the container body and the cover in a mounting direction of the cover.

With this structure, by engaging the guide part with the other fastening member engaging part when the cover is mounted to the container body, the container body and the cover is guided along the mounting direction of the cover. As the results, the cover can be favorably mounted to the container body. Therefore, it will be possible to reliably seal the cover with respect to the container body, and the reliable waterproofing performance can be obtained.

Preferably, the guide part includes a pair of guide plates which are provided on either one of the fastening member engaging parts arranged along the cover mounting direction when the cover is mounted on the opening of the container body, and adapted to be engaged with the other fastening member engaging part so as to clamp an outer face of the other fastening member engaging part.

In case where the guide part includes a pair of the guide plates in this manner, the guide plates will be reliably engaged with the other fastening member engaging parts, and so, the cover can be more favorably mounted to the container body.

BRIEF DESCRIPTION OF THE DRAWINGS

FIG. 2 is a view partly in section showing the waterproof box provided with a first and second embodiments of a cover mounting structure of a waterproof box according to the present invention;

DESCRIPTION OF THE PREFERRED EMBODIMENTS

Figure 1:
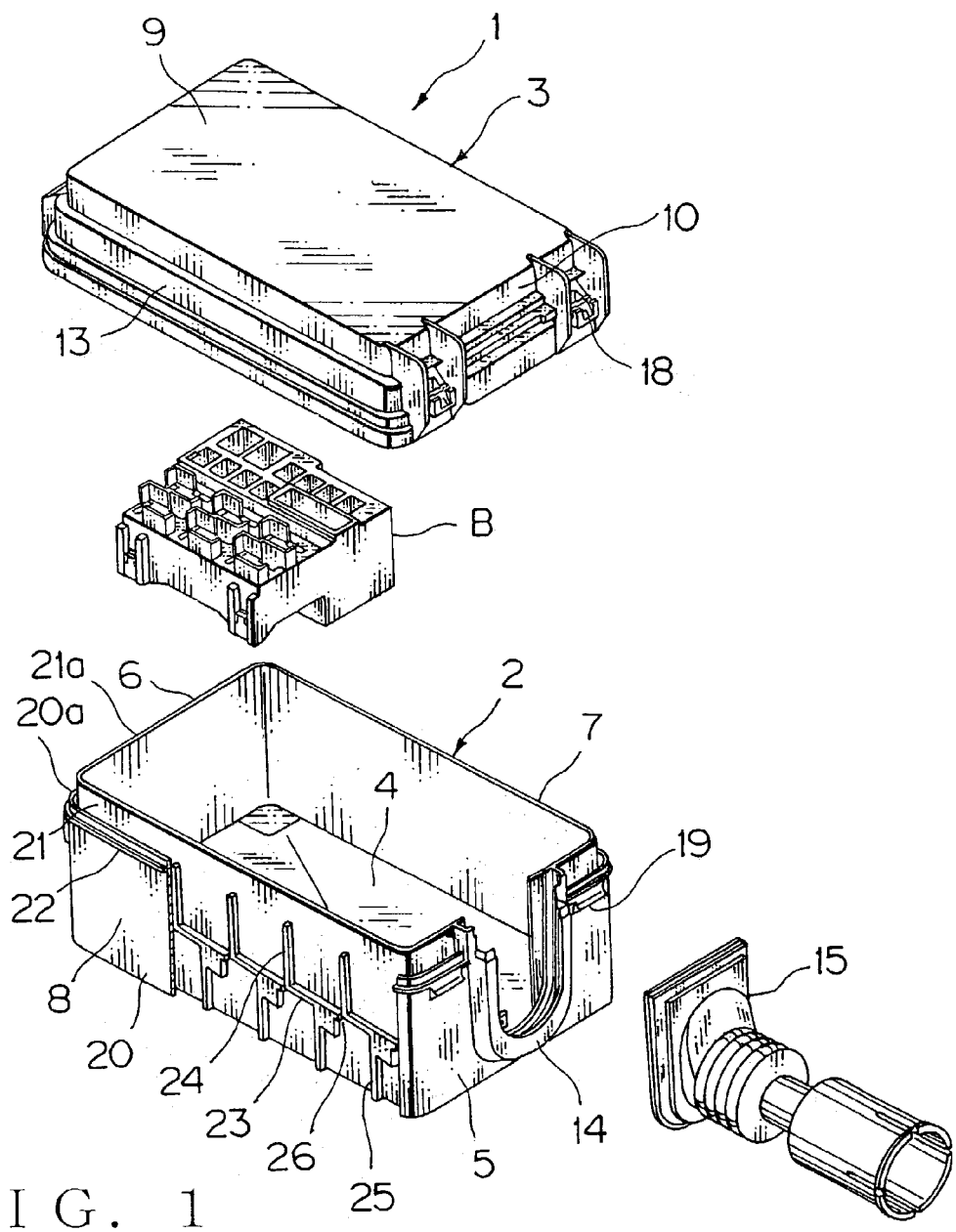
FIG. 1 is a perspective view showing an example of a waterproof box to which the present invention is applied.
Figure 10:
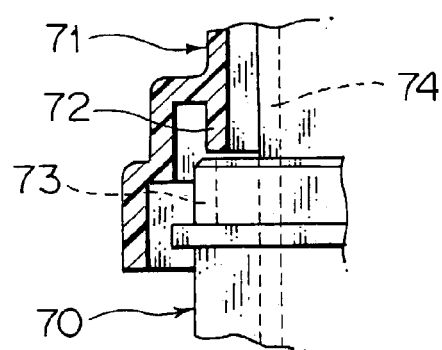
FIG. 10 is a sectional view showing a container body and a cover in a conventional waterproof box in an assembled state.

Now, several embodiments of the present invention will be described in detail, referring to the drawings.

In FIGS. 1 to 5, reference numeral 1 designates a waterproof box which may include an electrical junction box for containing various components required for connecting and treating wire harnesses in a motor vehicle, and electrical components such as fuses, relays, electronic control unit, etc.

The waterproof box 1 consists of a container body 2 and a cover 3 in a shape of a rectangular box which are formed of synthetic resin for example, by injection molding or the like.

The container body 2 is composed of a bottom wall 4 in a shape of a rectangular plate, and four side walls 5, 6, 7 and 8 which are integrally formed with the bottom wall 4 so as to be erected from respective edges of the bottom wall 4. The cover 3 is composed of a cover body 9 in a substantially rectangular shape for covering an opening of the container body 2, and four attached walls 10, 11, 12 and 13 which are integrally provided at edges of the cover body 9 at a substantially right angle with respect to the cover body 9, and intended to respectively surround upper parts of the side walls 5, 6, 7 and 8 of the container body 2.

Figure 3:
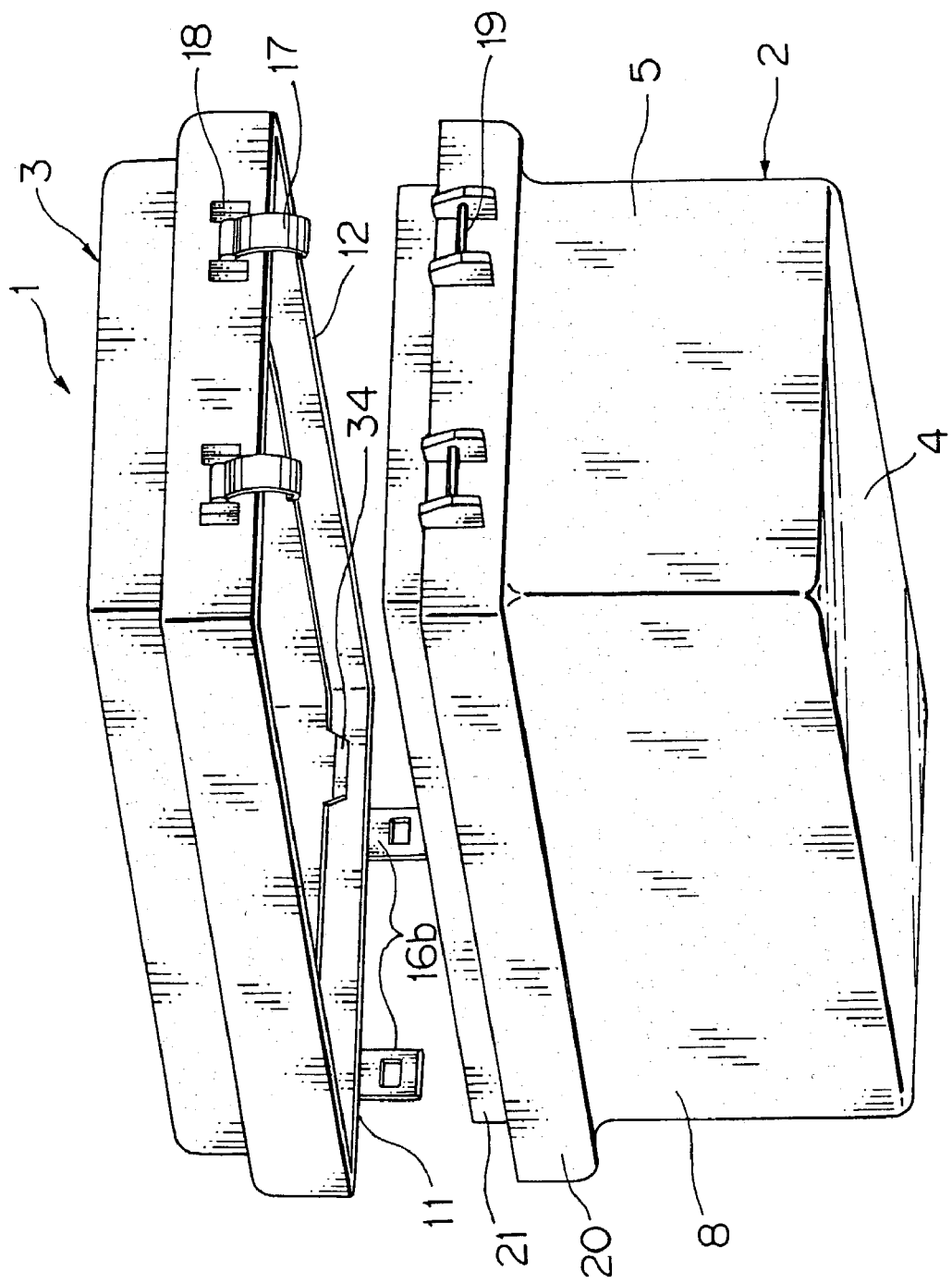
FIG. 3 is a perspective view showing the first embodiment of the cover mounting structure of the waterproof box according to the present invention.
Figure 4:
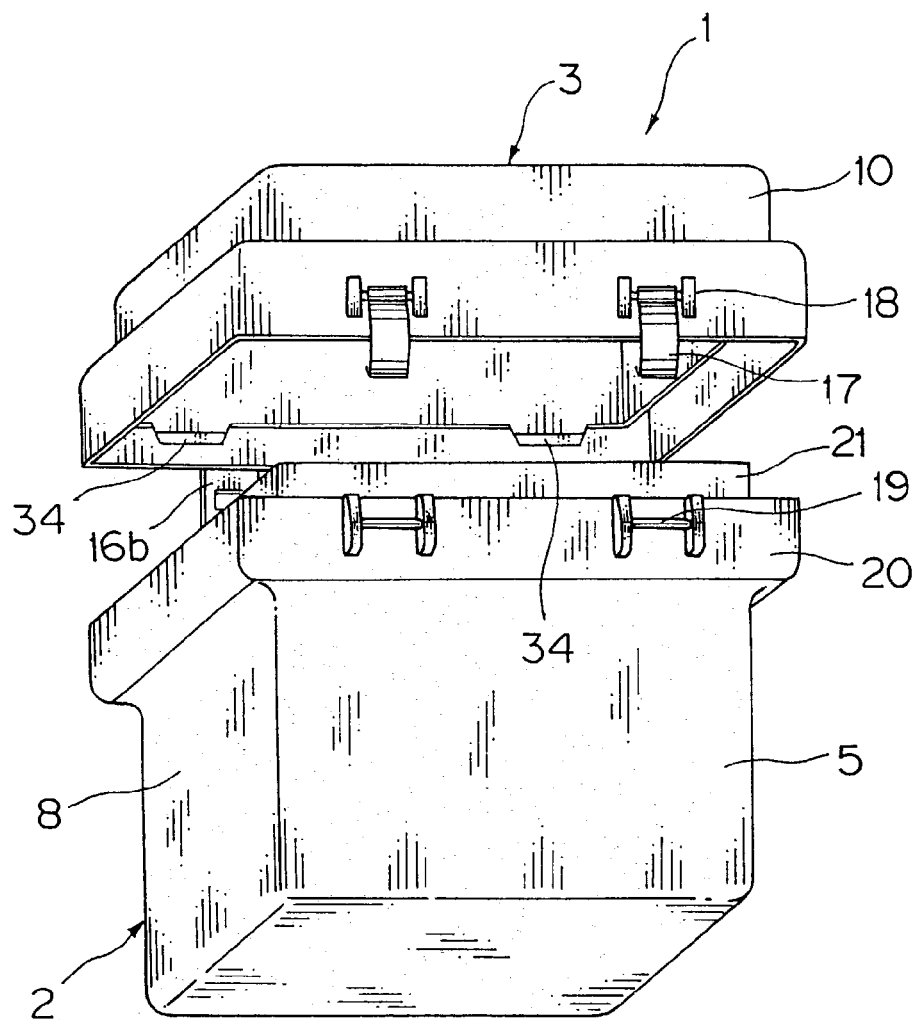
FIG. 4 is a perspective view showing the embodiment of the cover mounting structure of FIG. 3 as seen in a different direction.
Figure 5:
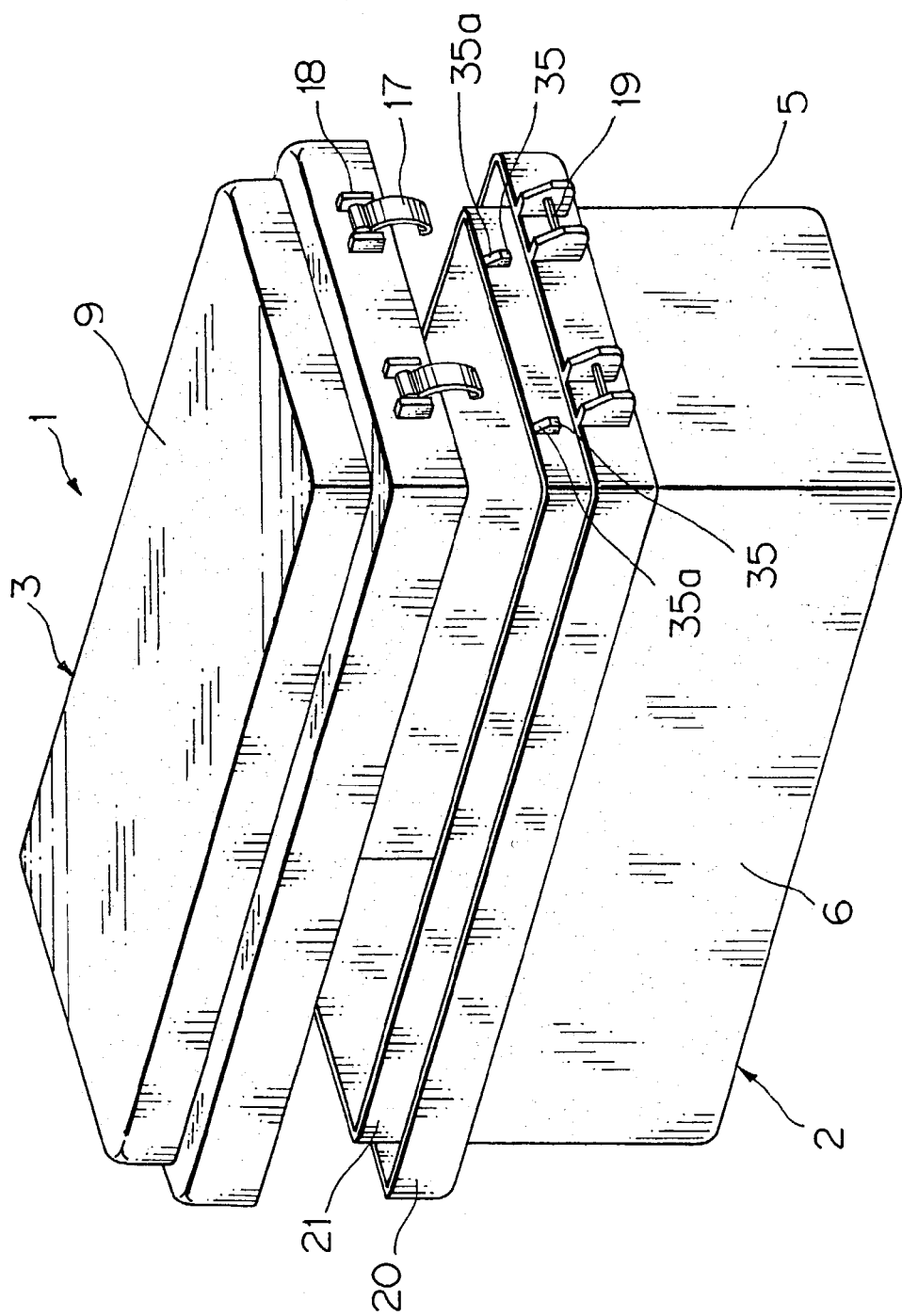
FIG. 5 is a perspective view showing the second embodiment of the cover mounting structure of the waterproof box according to the present invention.
Figure 6:
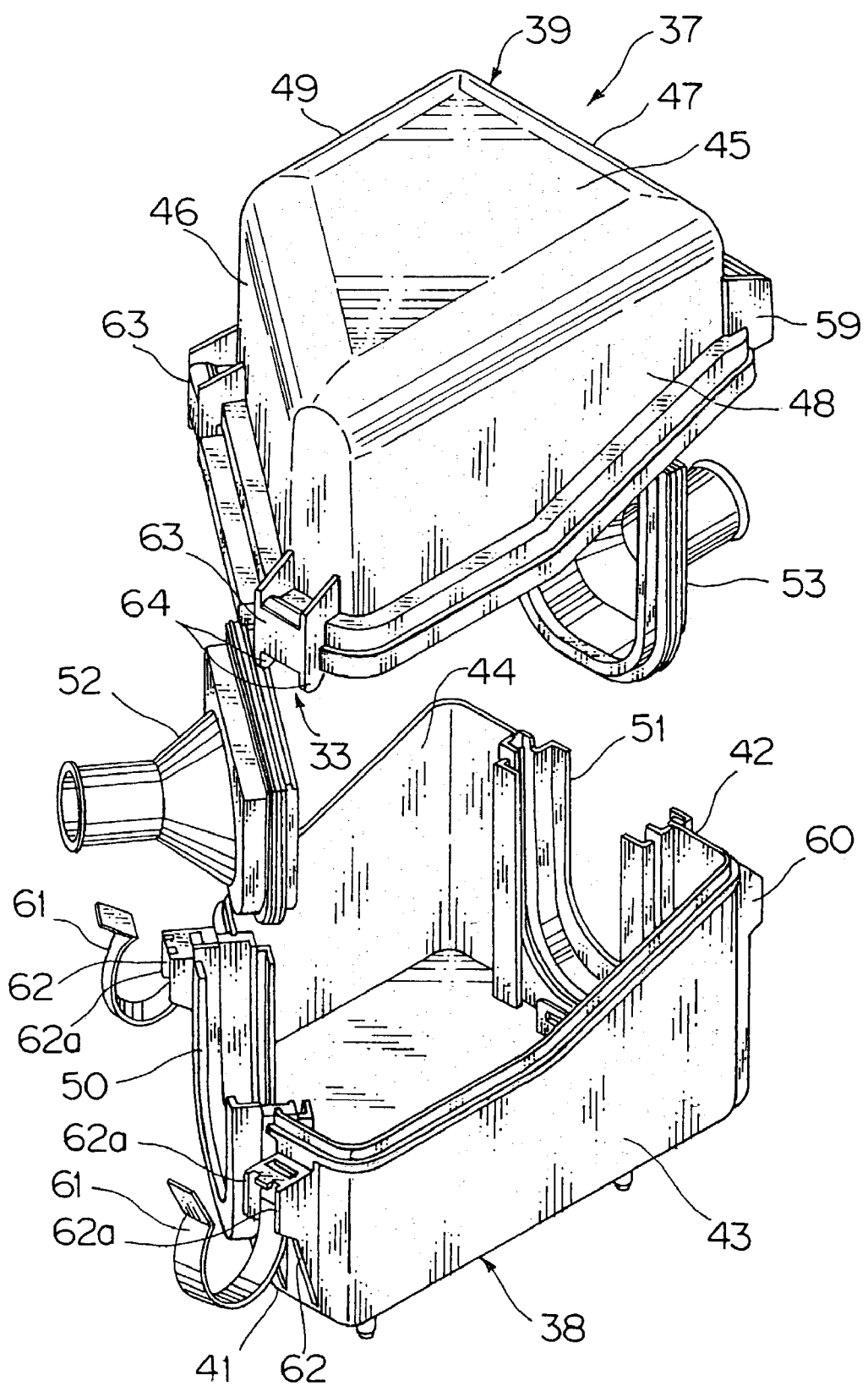
FIG. 6 is a perspective view showing a third embodiment of the cover mounting structure of the waterproof box according to the present invention.

One of the side walls of the container body 2, for example, either one (a first side wall) 5 of the two side walls in a longitudinal direction is provided with a mounting part 14 in a semi-circular shape through which electric wires such as wire harnesses to be connected to the electrical components in the container body 2 are guided. A grommet 15 is fitted to this mounting part 14 in order to protect the electric wires such as the wire harnesses. It is to be noted that in the waterproof box 1 which is shown in FIGS. 3 to 5, the mounting part is not provided on the first side wall 5.

A pair of engaging projections 16a (See FIG. 2) are provided on the second side wall 6 of the container body.2 opposed to the first side wall 5, at positions close to both sides, and at the same time, a pair of engaging frames 16b (See FIGS. 3 and 4) made of metal or the like to be engaged with the engaging projections 16a, are fixed to the second attached wall 11 of the cover 3 corresponding to the second side wall 6. The first attached wall 10 opposed to the second attached wall 11 is provided, at both sides of an area corresponding to the mounting part 14, with locking hook fixing parts 18 for rotatably supporting base ends of locking hooks 17. The locking hooks 17 are tightening means and made of metal having elasticity for example. On the other hand, the first side wall 5 is provided with locking parts 19 on which hook portions of the locking hooks 17 are hooked for engagement. With this structure, when the cover 3 is mounted on the opening of the container body 2, the engaging projections 16a of the container body 2 are first engaged with the engaging frames 16b of the cover 3. Thereafter, the hooking portions of the locking hooks 17 which are rotatably provided on the cover 3 are hooked on the locking parts 19 of the container body 2 so as to be elastically locked, thereby attaining tight seal between the container body 2 and the cover 3.

The side walls 5, 6, 7, 8 of the container body 2 are formed in a double-wall structure consisting of an outer wall 20 and an inner wall 21, in an entire area except the mounting part 14. Specifically, as shown in FIGS. 1 and 2, the outer wall 20 is positioned outside the inner wall 21 with a determined gap so as to surround the inner wall 21, in such a manner that an upper end 21a of the inner wall 21 is higher than an upper end 20a of the outer wall 20 so as to project from the latter. In an upper part of the outer wall 20, there is provided a protruding ridge 22 which extends in a substantially horizontal direction along an entire surface of the outer wall 20. It is to be noted that the side walls 5, 6, 7, 8 of the container body 2 as shown in FIGS. 3 to 5 are formed in the double-wall structure consisting of the outer wall 20 and the inner wall 21, only in their areas adjacent to the opening.

As shown in FIG. 1, there is provided, in a substantially middle part in a vertical direction between the outer wall 20 and the inner wall 21 of the container body 2, a horizontal rib 23 for partitioning a space between the outer wall 20 and the inner wall 21 into an upper space and a lower space. In addition, there are provided upper ribs 24 and lower ribs 25 extending in a vertical direction, above and below the horizontal rib 23, and the horizontal rib 23 is provided with communicating holes 26 which communicate the upper space with the lower space. An interval between the respective upper ribs 24 can be optionally determined in such a range that the upper ribs 24 may not be deformed when high pressure water is jetted to the outer wall 20.

Each of the lower ribs 25 is attached to a substantially middle part of the horizontal rib 23 between a pair of the upper ribs 24 attached thereto, in short, the upper ribs 24 and the lower ribs 25 are arranged on the horizontal rib 23 at different positions at a determined interval. A shape of the lower rib 25 is not particularly restricted provided that it extends in a vertical direction, but may be preferably in an inverted L-shape or an inverted convex shape having a larger width in an upper part than in a lower part as shown in the drawing. In case of forming the lower rib 25 in the inverted L-shape or inverted convex shape, lower end portions of a wider part are preferably tapered downwardly, or curved toward both ends.

The communicating holes 26 are provided so as to guide the water intruded above the horizontal rib 23 to the lower space. One communicating hole is provided between a pair of the upper ribs 24. Positions of the communicating holes 26 are not particularly limited, but they are preferably arranged at other positions than positions along rib faces of the lower ribs 25. More preferably, each of the communicating holes 26 is arranged in a substantially middle part between a pair of the lower ribs 25.

Referring to FIG. 2, the attached walls 10, 11, 12 and 13 of the cover 3 are provided with an outer groove 27 and an inner groove 28 into which the upper end 20a of the outer wall 20 and the upper end 21a of the inner wall 21 of the container body 2 are respectively inserted. The outer and inner grooves 27, 28 are defined by three wall portions, namely, an outer wall portion 29, a middle wall portion 30 and an inner wall portion 31. Specifically, the attached walls 10, 11, 12 and 13 are formed in a triple-wall structure in which the outer groove 27 is defined by the outer wall portion 29 and the middle wall portion 30, while the inner groove 28 is defined by the middle wall portion 30 and the inner wall portion 31. The outer wall portion 29 is formed in a step-like shape so that it can be engaged with an outer face of the outer wall 20 having the ridge 22.

When the cover 3 is mounted on the container body 2, the upper end 20a of the outer wall 20 and the upper end 21a of the inner wall 21 are respectively inserted into the outer and inner grooves 27, 28 substantially simultaneously.

More specifically, the middle wall portion 30 has a thickness smaller than a gap between the outer wall 20 and the inner wall 21 of the container body 2. When an inner face of the middle wall portion 30 of the first attached wall 10 comes into contact with an outer face of the inner wall 21, the inner face of the other middle wall portion 30 of the second attached wall 11 opposed to the relevant middle wall portion 30 is positioned in the gap between the outer wall 20 and the inner wall 21, while the outer face of the other middle wall portion 30 is positioned within a thickness of the outer wall 20. Moreover, a width of the outer groove 27, that is, the position of the outer wall portion 29 is such that when the inner face of the middle wall portion 30 of the first attached wall 10 is abutted against the outer face of the inner wall 21, the inner face of the outer wall portion 29 is located outward of an outer face of the outer wall 20. On the other hand, a width of the inner groove 28, that is, the position of the inner wall portion 31 is such that when the inner face of the middle wall portion 30 of the first attached wall 10 comes into contact with the outer face of the inner wall 21, the outer face of the inner wall portion 31 is located inward of the inner face of the inner wall 21. A packing 32 made of rubber, for example, may be provided in the inner groove 28, and a packing made of rubber may be provided also in the outer groove 27.

Lower ends of the outer wall portion 29, the middle wall portion 30 and the inner wall portion 31 are arranged in such a manner that when the cover 3 is mounted on the container body 2, the lower end of the middle wall portion 30 may first come into contact with the outer face of the inner wall 21, then the lower end of the outer wall portion 29 may come into contact with the outer face of the outer wall 20, and finally, before the lower end of the middle wall portion 30 comes into contact with the inner face of the outer wall 20, the lower end of the inner wall portion 31 can come into contact with the inner face of the inner wall 21.

The middle wall portion 30 has a guide part 33 for guiding the middle wall portion 30 into the gap between the outer wall 20 and the inner wall 21, thus enabling the cover 3 to be reliably fitted to the container body 2.

The guide part 33 may be of any design, provided that the cover 3 can be favorably fitted to the container body 2. Specifically, the guide part 33 may include a guide piece 34 which is provided at the lower end of the other middle wall portion 30 which is opposed to the relevant middle wall portion 30 and can get in touch with the inner wall 21 simultaneously when the inner face of the relevant middle wall portion 30 is brought into contact with the outer face of the inner wall 21. For example, the guide piece 34 is provided at the lower end of the middle wall portion 30 of the second attached wall 11, in case where the middle wall portion 30 of the first attached wall 10 is brought into contact with the inner wall 21.

The guide piece 34 extends in an extending direction of the middle wall portion 30 so that it can get in contact with the inner face of the outer wall 20, before the lower end of the inner wall portion 31 can get in contact with the inner face of the inner wall 21. Although two guide pieces 34 are provided at the lower end of the middle wall portion 30 in this embodiment (See FIG. 4), non limited number, for example, one or more than three guide pieces 34 may be provided. Alternatively, the guide piece 34 may be provided over the entire lower end of the middle wall portion 30.

A lower end of the guide piece 34 is inclined toward an inside of the outer groove 27 to form an inclined face 34a. Specifically, the inclined face 34a is provided in such a manner that when the cover 3 is mounted on the container body 2 while the other middle wall portion 30 opposed to the relevant middle wall portion 30 provided with the guide piece 34 is kept in contact with the outer face of the inner wall 21, the guide piece 34 may be reliably guided into the gap between the outer wall 20 and the inner wall 21, even though the inclined face 34a of the guide piece 34 is abutted against the upper end of the outer wall 20.

In addition, as the second embodiment, the guide part 33 may include a guide 35 which is provided on the outer face of the inner wall 21 of the container body 2, as shown in FIG. 2.

The guide 35 may be, for example, in a form of a tapered rib. Although the inner walls 21 of all the four side walls 5, 6, 7, 8 may be provided with the tapered ribs 35, only one tapered rib 35 may be provided on the inner wall 21 of the first side wall 5, for example.

The tapered rib 35 is intended to position the middle wall portion 30 of the other inner wall 21 opposed to the inner wall 21 which is provided with this tapered rib 35, so that the middle wall portion 30 may be accurately inserted into the gap between that inner wall 21 and the outer wall 20.

The tapered rib 35 has a tapered area 35a extending in a vertical direction from the upper end of the inner wall 21 in a gradually inclined shape. Specifically, the tapered rib 35 may be formed in such a shape that a rectangular shape in cross section may be gradually inclined from its center part toward the upper end of the inner wall 21 to form the tapered area 35a, or may be formed in a shape of right triangle in cross section. A plurality of the tapered ribs 35 may be provided on all or either of the inner walls 21 except the inner wall 21 adapted to engage with the guide piece 34.

It is possible to provide both the tapered rib 35 and the guide piece 34 or either one of them.

Now, operation will be described.

The cover 3 is mounted on the opening of the container body 2, and after the engaging frames 16b of the cover 3 have been engaged with the engaging projections 16a of the container body 2, the hook portions of the locking hooks 17 of the cover 3 are engaged with the locking parts 19 of the container body 2 to attain the elastic lock. On this occasion, the upper end 20a of the outer wall 20 is inserted into the outer groove 27, and at the same time, the upper end 21a of the inner wall 21 is inserted into the inner groove 28 so as to press the packing 32. In this manner, the cover 3 is tightly sealed onto the container body 2.

Each of the side walls 5, 6, 7, 8 of the container body 2 is formed in the double-wall structure consisting of the outer wall 20 and the inner wall 21, and the gap between the outer wall 20 and the inner wall 21 is made as small as possible so that capacity of the container body 2 may not be decreased; For this reason, it may sometimes happen that the gap between the outer wall 20 and the inner wall 21 becomes narrower due to tolerance between the two walls or inclination of the walls. However, by providing the guide part 33, the cover 3 can be favorably mounted on the container body 2.

Specifically, in case where the guide piece 34 of the guide part 33 is provided on the middle wall portion 30 of the second attached wall 11, when the cover 3 positioned close to the opening of the container body 2 is mounted on the container body 2, the inner face of the lower end of the middle wall portion 30 of the first attached wall 10 is brought into contact with the outer face of the inner wall 21, as a first step: Maintaining this state, the cover 3 is moved downwardly in a vertical direction. Then, the guide piece 34 will intrude into the gap between the outer wall 20 and the inner wall 21 and will be reliably guided into the gap, even though the gap between the outer wall 20 and the inner wall 21 has been narrow. Simultaneously, the upper end 20a of the outer wall 20 is inserted into the outer groove 27, and at the same time, the upper end 21a of the inner wall 21 is inserted into the inner groove 28. Thus, the cover 3 will be favorably fitted to the container body 2 and reliably sealed.

On this occasion, by providing the inclined face 34*a* at the lower end of the guide piece 34, the guide piece 34 may be easily guided into the gap between the outer wall 20 and the inner wall 21 by way of the inclined face 34*a*, even though the lower end of the guide piece 34 is abutted against the upper end of the outer wall 20. In this manner, the cover 3 can be more favorably fitted to the container body 2.

Moreover, by providing the tapered rib. 35, that is another example of the guide part 33, on the inner wall 21 of the first side wall 5, when the cover 3 is moved downward in a vertical direction in a state where the inner face of the lower end of the middle wall portion 30 of the first attached wall 10 is kept in contact with the outer face of the inner wall 21, the lower end of the middle wall portion 30 of the first attached wall 10 comes in contact with the tapered rib 35 and guided toward the outer wall 20 along the tapered area 35*a*, as the guide piece 34 intrudes into the gap between the outer wall 20 and the inner wall 21. In short, the whole cover 3 is moved in a longitudinal direction of the container body 2. This will make the guide piece 34 move toward the inner wall 21, and because the guide piece 34 will be reliably introduced into the gap between the outer wall 20 and the inner wall 21, the cover 3 can be more favorably fitted to the container body 2.

Further, by providing only the tapered rib 35 on the inner wall of the first side wall 5, the cover 3 can be favorably fitted to the container body 2. Specifically, the inner face of the lower end of the middle wall portion 30 of the first attached wall 10 is brought into contact with the outer face of the inner wall 21, as a first step, and in this state, the cover 3 is moved downwardly in a vertical direction. When the lower end of the middle wall portion 30 of the first attached wall 10 comes into contact with the tapered rib 35 and guided along its tapered area 35*a* toward the outer wall 20. With this movement, the middle wall portion 30 of the second attached wall 11 moves toward the inner wall 21. In short, the whole cover 3 is moved in a longitudinal direction of the container body 2, and positioned so that the middle wall portion 30 of the second attached wall 11 may be inserted into the gap between the outer wail 20 and the inner wall 21. As the results, the middle wall portion 30 of the second attached wall 11 is reliably introduced into the gap between the outer wall 20 and the inner wall 21 even though the gap has been narrow, and therefore, the cover 3 and the container body 2 can be favorably sealed with respect to each other.

In conclusion, because the cover mounting structure of the waterproof box according to the present invention includes the guide part 33, even though in the double-wall structure of the side walls 5, 6, 7, 8 of the container body 2, the gap between the outer wall 20 and the inner wall 21 has become narrow, the cover 3 can be favorably fitted to the container body 2. Thus, assembling performance of the cover 3 to the container body 2 can be enhanced, and the cover 3 and the container body 2 can be reliably sealed with respect to each other.

In addition, by providing the horizontal rib 23, the upper ribs 24 and the lower ribs 25 between the outer wall 20 and the inner wall 21, the outer wall 20 and the inner wall 21 will be prevented from being deformed or inclined. Thus, the assembling performance of the cover 3 to the container body 2 can be further enhanced, and they can be more reliably sealed with respect to each other.

FIGS. 6 to 9 show the third embodiment of the cover mounting structure of the waterproof box according to the present invention. In contrast with the cover mounting structure of the waterproof box in the above described embodiments, the guide part 33 in this embodiment is provided at a place where a locking hook 61 is engaged or fitted.

Specifically, the waterproof box 37 is composed of a container body 38 and a cover 39 in a box-like shape made of synthetic resin or the like, in the same manner as the above described waterproof box 1. The container body 38 has a bottom wall 40, and four side walls, namely a first side wall 41, a second side wall 42, a third side wall 43, and a fourth side wall 44 which are integrally erected from edges of the bottom wall 40. The third side wall 43 is provided substantially in parallel to the fourth side wall 44, and the second side wall 42 is provided substantially at a right angle with the third and fourth side walls 43, 44. However, the first side wall 41 is not provided substantially in parallel to the second side wall 42, although it may be provided substantially in parallel to the second side wall 42 in the same manner as in the above described waterproof box 1. In short, the waterproof box 37 may be formed in a shape of a rectangular box.

The cover 39 has a cover body 45, and four attached walls, namely, a first attached wall 46, a second attached wall 47, a third attached wall 48, and a fourth attached wall 49 which are provided at edges of the cover body 45 in a direction substantially perpendicular to the cover body 45 so as to respectively surround upper parts of the side walls 41, 42, 43, 44 of the container body 38.

The first side wall 41 and the second side wall 42 of the container body 38 are provided with mounting parts 50, 51 in a semi-circular shape through which electric wires such as wire harnesses to be connected to electrical components in the container body 38 are guided. Grommets 52, 53 are fitted to these mounting parts 50, 51 in order to protect the electric wires such as the wire harnesses.

In the upper parts of the side walls 41, 42, 43, 44 of the container body 38, there is formed a protruding ridge 54 extending in a horizontal direction along an entire outer surface of the container body 38. Although the side walls 41, 42, 43, 44 are not formed in a double-wall structure in this embodiment, they may have the double-wall structure in the same manner as in the above described waterproof box 1.

Figure 9:
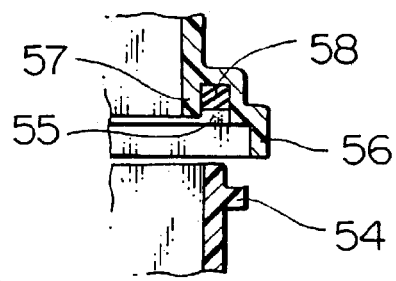
FIG. 9 is a sectional view showing a container body and a cover of the cover mounting structure in the embodiment of FIGS. 6 and 7 in an assembled state.
Figure 11:
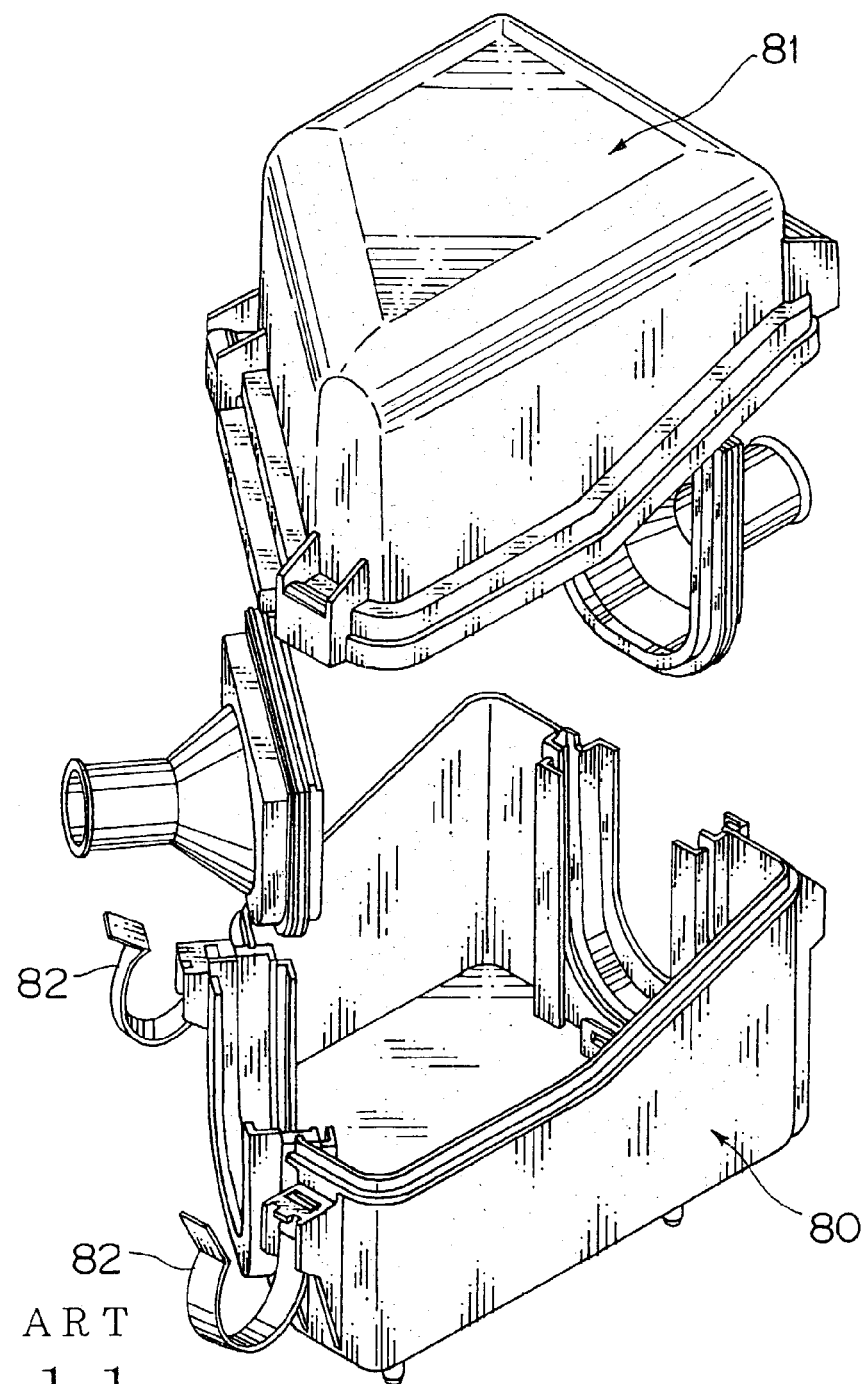
FIG. 11 is a perspective view showing the conventional cover mounting structure provided on the waterproof box.
Figure 12:
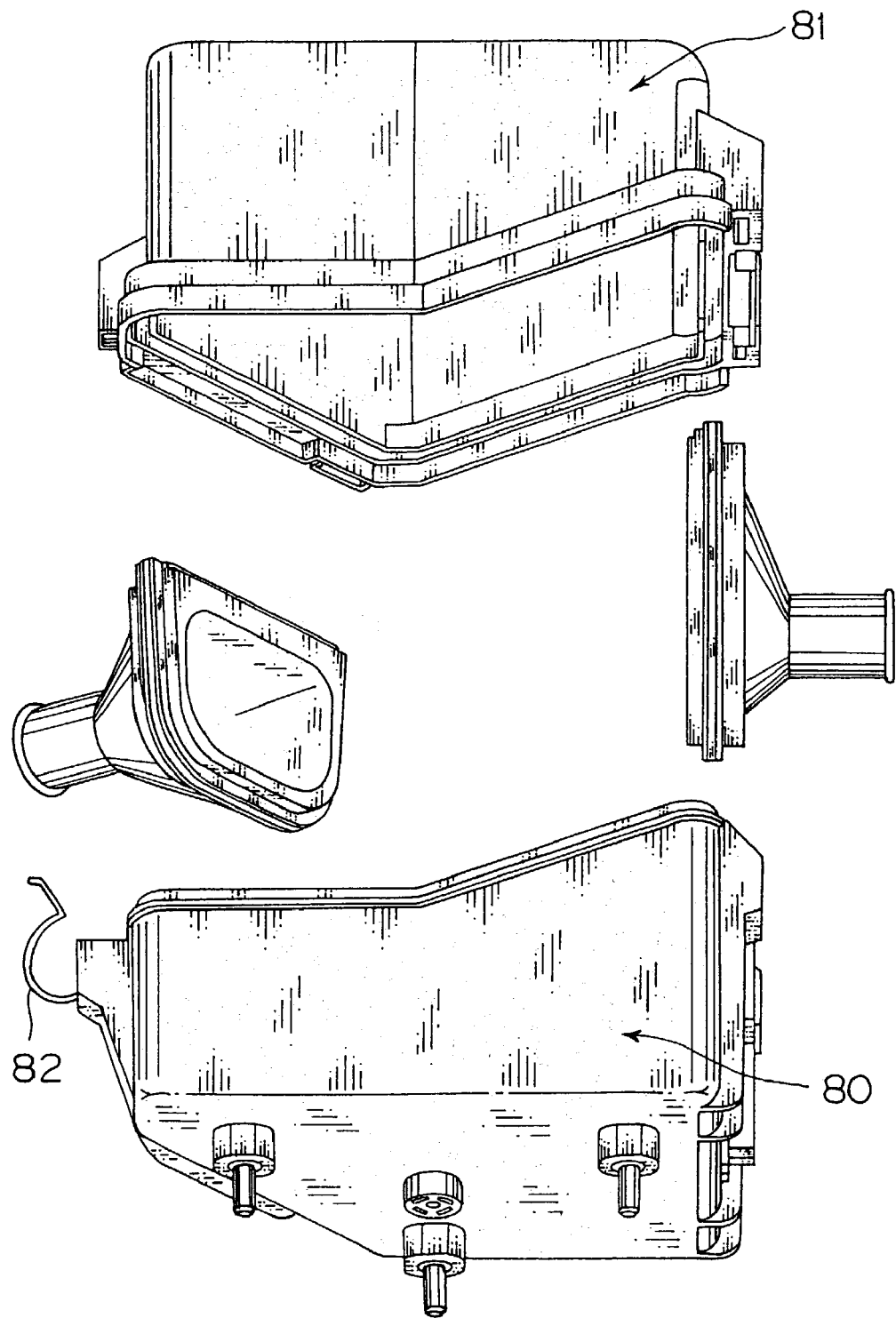
FIG. 12 is a perspective view showing the conventional cover mounting structure provided on the waterproof box.

The first, second, third and fourth attached walls 46, 47, 48, 49 of the cover 39 are provided with grooves 55 into which the upper ends of the side walls 41, 42, 43, 44 of the container body 38 are inserted, as shown in FIG. 9. Each of the grooves 55 is defined between the outer wall portion 56 and the inner wall portion 57, and a packing 58 formed of rubber or the like is provided in the groove 55.

A pair of engaging parts 59 respectively having engaging projections (not shown) are provided on the second attached wall 47 of the cover 39, at both sides of an area corresponding to the mounting part 51, and at the same time, there are provided a pair of engaging frame fixing parts 60 for fixing engaging frames (not shown) made of metal or the like, to be engaged with the engaging projections, on the second side wall 42 of the container body 38 at both sides of the mounting part 51.

On the first side wall 41 of the container body 38, there are provided a pair of locking hook fixing parts 62 for rotatably holding base ends of the locking hooks 61 which are fastening members made of metal having elasticity, for example, respectively at both sides of the mounting part 50. Although positions of the locking hook fixing parts 62, 62 are not particularly limited, one of the locking hook fixing parts 62 close to the fourth side wall 44 may be located on the first side wall 41, and the other locking hook fixing part 62 may be located at a corner between the first side wall 41 and the third side wall 43, so that the two locking hook fixing parts 62 may not be located on a same plane.

Each of the locking hook fixing part 62 has a pair of side pieces 62*a*, 62*a* extending in parallel in a vertical direction. The base end of the locking hook 61 is held between these side pieces 62*a*, 62*a* so as to be rotated along a vertical direction. An upper face of the locking hook fixing part 62 is in a substantially rectangular shape on a substantially horizontal plane.

On the first attached wall 46 of the cover 39, there are provided, at positions corresponding to the locking hook fixing parts 62, a pair of locking parts 63 to be respectively engaged with distal ends of the locking hooks 61 which are rotatably held by the locking hook fixing parts 62. The locking parts 63 are projected from the cover 39 so that the locking parts 63 may be positioned above the locking hook fixing parts 62 in a vertical direction, when the cover 39 is mounted on the opening of the container body 38. In short, the locking parts 63 and the locking hook fixing parts 62 are arranged in a vertical direction in which the cover 39 is mounted.

Lower faces of the locking parts 63 are formed in such a manner that these lower faces may be positioned close to the upper faces of the locking hook fixing parts 62, when the cover 39 has been mounted on the opening of the container body 38. With this arrangement, after the cover 39 has been mounted on the opening of the container body 38, and the engaging frames of the container body 38 and the engaging projections of the cover 39 have been engaged with each other, the distal ends of the locking hooks 61 are hooked on the locking parts 63 of the cover 39 to be elastically locked, thereby allowing the cover 39 and the container body 38 to be tightly sealed with respect to each other.

The lower faces of the locking parts 63 are substantially in parallel to the upper faces of the locking hook fixing parts 62, and formed in a substantially rectangular shape having a substantially same size in width as the upper faces of the locking hook fixing parts 62. Each of the locking parts 63 has, on both sides of the lower face, a pair of guide plates 64, 64 extending from the lower face in a vertical direction.

Figure 8:
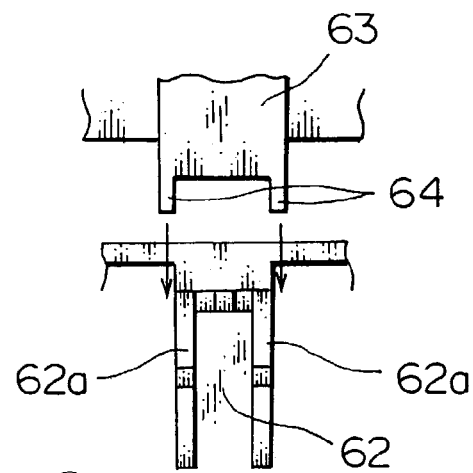
FIG. 8 is a front view showing an essential part of the cover mounting structure in the embodiment of FIGS. 6 and 7.

As shown in FIG. 8, lower end portions of the guide plates 64, 64 have such a length that when the cover 39 is mounted on the container body 38, the lower end portions of the guide plates 64, 64 can get in touch with the side pieces 62*a*, 62*a* of the locking hook fixing part 62, before the cover 39 has come into contact with the container body 38. Moreover, the lower end portions of the guide plates 64 are rounded.

Figure 7:
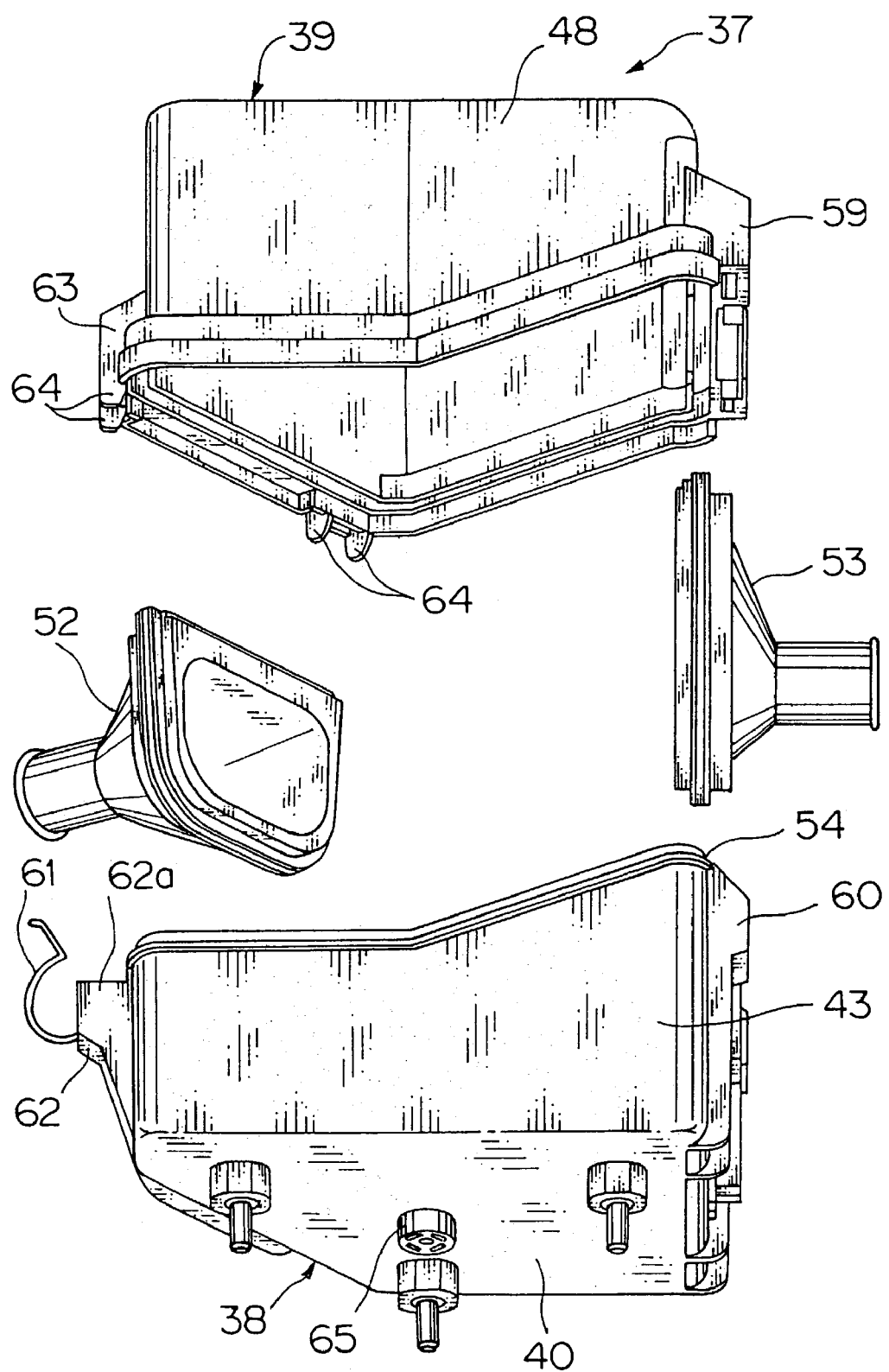
FIG. 7 is a perspective view showing the embodiment of the cover mounting structure of FIG. 6.

A pair of the guide plates 64, 64 are formed in parallel and have a space therebetween which is slightly larger than a space between the side pieces 62*a*, 62*a* of the locking hook fixing part 62. This means that unless the locking hook fixing part 62 is accurately positioned between the pair of the guide plates 64, 64, the cover 39 cannot be fitted to the container body 38. In other words, the pair of the guide plates 64, 64 are adapted to hold the side pieces 62*a*, 62*a* of the locking hook fixing part 62 so as to clamp them, and guide the container body 38 and the cover 39 along the mounting direction of the cover 39. Although a pair of the guide plates 64, 64 are provided on the locking part 63 in this embodiment, it is possible to provide them on the locking hook fixing part 62 or on both the locking hook fixing part 62 and the locking part 63. In FIG. 7, numeral 65 designates a discharge port for discharging water intruded into the container body 38.

By providing the pair of the guide plates 64, 64 as the guide part 33, the cover 39 can be favorably mounted to the container body 38.

When the cover 39 which has been located close to the opening of the container body 38 is mounted to the container body 38, the pair of the guide plates 64, 64 are engaged with the side pieces 62*a*, 62*a* of the locking hook fixing part 62 so as to clamp them, as a first step. In this state, the cover 39 is moved downwardly. In this manner, by way of the engagement between the pair of the guide plates 64, 64 and the locking hook fixing part 62, the cover 39 can be fitted to the container body 38 without misalignment. Because the cover 39 can be positioned with respect to the container body 38 by the engagement between the pair of the guide plates 64, 64 and the locking hook fixing part 62, the side walls 41, 42, 43, 44 can be accurately inserted into the grooves 55 of the attached walls 46, 47, 48, 49 of the cover 39. Accordingly, the cover 39 can be reliably mounted to the container body 38 without misalignment.

Since the two locking parts 63 provided on the cover 39 are not on the same plane, by engaging the two pairs of the guide plates 64, 64 with the locking hook fixing parts 62 respectively, the cover 39 can move only in the vertical direction. Accordingly, the cover 39 can be more reliably mounted to the container body 38 without misalignment.

After the cover 39 has been mounted on the container body 38 as described above, the engaging projections of the cover 39 are engaged with the engaging frames of the container body 38. Then, the distal end portions of the locking hooks 61 are hooked on the locking parts 63 of the cover 39 to attain the elastic lock. Since the upper ends of the side walls 41, 43, 43, 44 have been accurately inserted into the grooves 55 on this occasion, the packing 58 in the grooves 55 will be pressed to seal, and reliable tight seal between the cover 39 and the container body 38 can be attained.

In conclusion, by providing the pair of the guide plates 64, 64, the cover 39 can be positioned with respect to the container body 38 by means of the guide plates 64, 64, when the cover 39 is mounted to the container body 38. Therefore, the cover 39 can be accurately fitted to the container body 38, with enhanced assembling performance, and the tight seal between the container body and the cover 39 can be reliably attained.

Although the present invention has been fully described by way of examples with reference to the accompanying drawings, it is to be noted that various changes and modifications can be made within a scope of the present invention.

What is claimed is:

1. A cover mounting structure of a waterproof box comprising a container body and a cover to be mounted on an opening of said container body, said container body including side walls in a double-wall structure each of which is composed of an inner wall and an outer wall, said inner wall being projected longer than said outer wall, said cover including attached walls, each of which is provided with an outer groove defined between an outer wall portion and a middle wall portion and an inner groove defined between said middle wall portion and an inner wall portion, wherein said cover is mounted to said container body by respectively inserting said inner wall and said outer wall of said container body into said inner groove and said outer groove of said cover, wherein, on said middle wall portion of said cover which is in contact with an outer face of said inner wall of said container body which is projected longer than said outer wall, there is provided a guide piece for guiding said opposed middle wall portion into a gap between said outer wall and said inner wall, wherein said guide piece is provided at a distal end portion of its outer face with an inclined area which is gradually inclined inwardly toward said distal end portion, wherein said guide piece terminates in a free distal end and the inclined area is located below a top of the outer wall portion.

2. A cover mounting structure of a waterproof box comprising a container body and a cover to be mounted on an opening of said container body, said container body including side walls in a double-wall structure each of which is composed of an inner wall and an outer wall, said inner wall being projected longer than said outer wall, said cover including attached walls, each of which is provided with an outer groove defined between an outer wall portion and a middle wall portion and an inner groove defined between said middle wall portion and an inner wall portion, wherein said cover is mounted to said container body by respectively inserting said inner wall and said outer wall of said container body into said inner groove and said outer groove of said cover, wherein, on an outer face of said inner wall, there is uprightly provided a guide for positioning said middle wall portion defining said outer groove, whereby the middle wall portion can be inserted into a gap between said outer wall and said inner wall, wherein an area of said guide to be faced with said opening of the container body is gradually inclined from the outer face of said inner wall toward said outer wall, wherein said guide is a tapered rib that extends outwardly from the outer surface of the inner wall.

3. The cover mounting structure of the waterproof box as claimed in claim 2, wherein on said middle wall portion of said cover which is in contact with an outer face of said inner wall of said container body which is projected longer than said outer wall and provided with said guide, there is provided a guide piece for guiding said opposed middle wall portion into a gap between said outer wall and said inner wall.

4. The cover mounting structure in the waterproof box as claimed in claims 1, 2 or 3 wherein, a fastening member engaging part is located on each of the container body and cover, on either or both of the fastening member engaging parts, there is provided a guide part to be engaged with the other fastening member engaging part for guiding said container body and said cover in a mounting direction of said cover.

5. The cover mounting structure of the waterproof box as claimed in claim 4, wherein said guide part includes a pair of guide plates which are provided on either one of said fastening member engaging parts arranged along the cover mounting direction when said cover is mounted on the opening of said container body, and adapted to be engaged with the other fastening member engaging part so as to clamp an outer face of said other fastening member engaging part.

* * * * *